United States Patent

[11] 3,553,484

[72] Inventor Gerhard Gunter Gassmann
Berkheim, Germany
[21] Appl. No. 710,940
[22] Filed Mar. 6, 1968
[45] Patented Jan. 5, 1971
[73] Assignee International Standard Electric Corporation
New York, N.Y.
a corporation of Delaware
[32] Priority Mar. 15, 1967
[33] Germany
[31] No. ST26624

[54] PULSE GENERATOR WITH TIME DELAY
7 Claims, 9 Drawing Figs.

[52] U.S. Cl. .......... 307/141, 307/293, 307/300
[51] Int. Cl. .......... H03k 17/28
[50] Field of Search .......... 307/106, 141, 293, 300; 331/108; 330/28(30)M

[56] References Cited

UNITED STATES PATENTS

| | | | |
|---|---|---|---|
| 2,876,365 | 3/1959 | Slusser | 307/223 |
| 2,985,770 | 5/1961 | Kneisel | 307/293X |
| 3,018,389 | 1/1962 | Herscher | 307/293X |
| 3,144,563 | 8/1964 | Cohler | 307/293X |
| 3,312,839 | 4/1967 | Briley (I) | 307/293X |
| 3,317,755 | 5/1967 | Briley (II) | 307/293X |

OTHER REFERENCES

Lohman, Robert D. & Johnson, Ronald R., Transistor Circuits with Adjustable Time Delays, R.C.A. Technical Notes; RCA TN No. 128 April 1, 1958 307/293

*Primary Examiner*—Robert K. Schaefer
*Assistant Examiner*—T. B. Joike
*Attorneys*—C. Cornell Remsen, Jr., Rayson P. Morris, Percy P. Lantzy, Philip M. Bolton and Isidore Togut

ABSTRACT: A multistage transistor time-delay pulse generator in which the delay between stages conventionally produced by R-C networks is achieved by using the storage time phenomenon of transistors, and the capacitors are eliminated. In one embodiment a chain of three transistors stages are coupled solely by resistors with the last transistor feeding back to the base of the first transistor. Other embodiments use diodes or transistors instead of the resistors and in one such other embodiment instead of single transistors between successive stages a pair of transistors in tandem is employed.

INVENTOR
GERHARD-GÜNTER GASSMANN

BY Philip M. Bolton
ATTORNEY

INVENTOR
GERHARD-GÜNTER GASSMANN

BY Philip L. Bolton
ATTORNEY

INVENTOR
GERHARD-GÜNTER GASSMANN

BY Philip M. Bolton
ATTORNEY

PULSE GENERATOR WITH TIME DELAY

The invention relates to a pulse generator with time delay in which the frequency and the duration of the pulses is determined by the delay time of one or several time-delay elements.

In general R-C generators are used to produce pulses, e.g. multivibrators, blocking oscillators or the like, in which the time constants of one or of several RC-elements are used to select the frequency and the pulse duration. Time delay pulse generators have already been proposed. In these pulse generators the time delay of delay lines is used to determine the frequency and the pulse duration. A delay line with a relatively long time delay however is either very long or it operates with electroacoustic converts in connection with the traveling time of sound in a medium (e.g. glass). In both cases, components are bulky and space consuming in addition to being costly. Finally, the variation of the frequency is either impossible or possible only within a limited range.

It is an object of the present invention to provide an improved delay time pulse generator, which requires relatively little space, costs less, lends itself to integrated technique and whose frequency can be varied in a simple way.

In accordance with this invention there is provided a pulse generator having a plurality of transistor stages with the transistor in each stage biased to be in a state of saturation during conduction. Successive stages are coupled, with the last stage being coupled to the first, so that conduction of each transistor terminates conduction in the next transistor. The time delay between termination of conduction in each transistor and the initiation of conduction in the following transistor is principally determined by the storage time of the transistor whose conduction is being terminated.

The foregoing and other further objects of the present invention will become apparent from the following description of embodiments thereof, reference being had to the drawings in which:

FIG. 1*a* is a schematic diagram of a circuit used to explain the storage time effect;

FIGS. 1*b* and 1*c* are waveforms used in connection with the explanation of FIG. 1*a;*

In a time delay pulse generator in which the frequency and the duration of the pulses are determined by one or several time delay elements, the present invention proposes that these time delay elements are semiconductor elements (e.g. transistors, diodes) their delay in blocking serving as time delay. It is considered advantageous that, in order to increase the delay time of the semiconductor elements, a ratio as high as possible is used of conductive current to "remove current" (the base current which flows in a transistor, used as a switch, in the common emitter circuit when the charge of the base region is "removed"). It is desirable to supply conductive current to the base of a transistor through a resistor connected to as high a voltage as possible and to supply removal current from as low a voltage as possible. In a separate example the time delay pulse generator consists of three or more odd numbers of transistors each transistor having a collector resistor and the collector of each transistor being connected via a coupling resistor with the base of the following transistor. The collector of the last stage is coupled to the base of the first stage through a resistor. It is considered as particularly advantageous to use diodes instead of coupling resistors, the nonconductive delay time of which diodes is smaller than the one of the transistors. It is also advantageous to use transistors in the collector circuitry, instead of the coupling resistors. Frequency can be adjusted by controlling the base bias. The frequency can be varied readily by virtue of the fact that from the base of the transistors, the nonconductive delay time of which is made use of, leakage resistors lead to a variable voltage source. If the time delay pulse generators are produced as integrated circuits it is revealed suitable to replace said leakage resistors by transistors.

The arrangement according to the invention shows the advantage that a simple time delay generator is provided, requiring little space and being particularly suitable for integrated circuitry application because neither coils nor capacitors and, if desired, even no resistors are required.

Figure 1A:
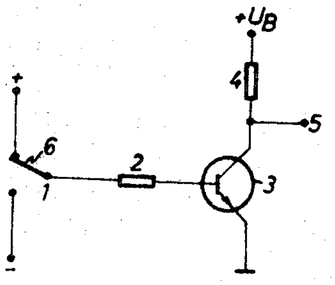
Figure 3:
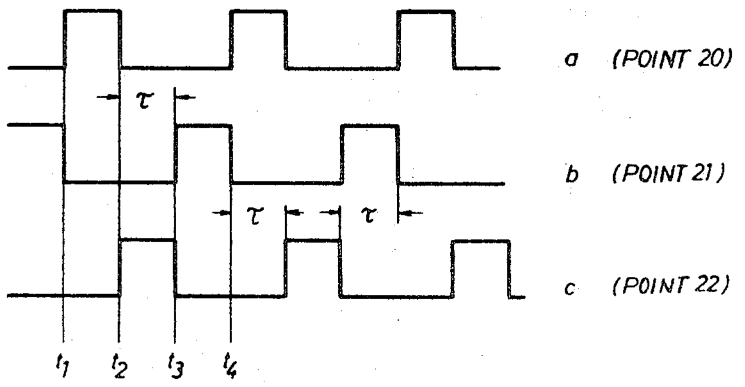
FIG. 3 is a set of waveforms used in the explanation of the operation of FIG. 2.

The invention is explained in detail with the aid of examples. The nonconductive delay time of semiconductors will be explained concisely with the aid of the FIGS. 1*a* to 1*c*. In FIG. 1*a*, 3 represents a transistor, 4 a collector resistor, connected to the battery voltage $+U_B$. 2 shows a coupling resistor. 6 is a switch, the potential of which can be positive or negative at point 1, depending on its position. 5 is a tapping from which the collector voltage of the transistor 3 can be derived. These two voltages, led to the switch, shall not be referred to ground potential but to the reference voltage at which the operation of the base current commences. This is the case for silicon transistors at approximately 0.5 to 0.7v. In order to achieve particularly long delay times it is sufficient that the negative voltage, relative to ground, have a value of 0.7 v. +0.3 v. This enables one to use a transistor of the same kind as the transistor 3 as a switch.

Figures 1B, 1C:
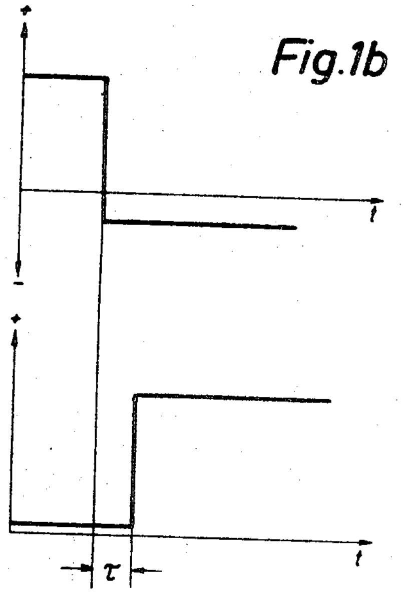

FIG. 1*b* shows the time curve of potential 1, if switch 6 is switched from positive to negative potential. This switch-over is idealized as infinitely quick.

FIG. 1*c* shows the collector voltage of the transistor at point 5. The voltage rises in the positive direction after the delay time T has elapsed. The higher the forward current of the base-emitter diode is, which current flows from the positive pole to the base of the transistor via the switch and via resistor 2, the longer the time delay. This delay time is further increased as the relative voltage applied to point 1 via the negative pole is decreased. The lower said blocking voltage, the smaller is the so-called "remove current" which flows back during said time via resistor 2. In order to achieve as long a delay time T as possible, it is provided, according to the invention, to make the ratio of forward current to "remove current" as large as possible. This measure is achieved in that the positive voltage, led to the switch 6, is made as high as possible and the negative voltage as small as possible.

Figure 2:
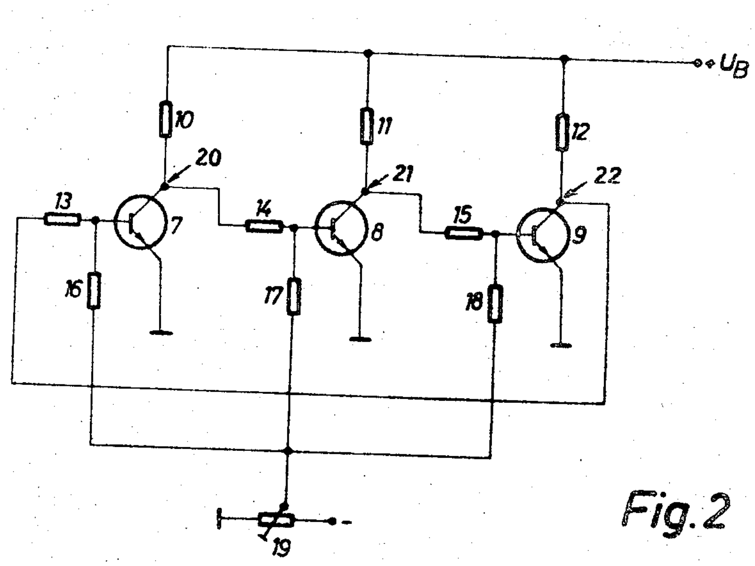
FIG. 2 is a schematic diagram of one embodiment of the invention.

FIG. 2 shows a time delay pulse generator according to the invention. The transistors 7, 8 and 9 correspond to the transistors 3 in FIG. 1*a*. The resistors 10, 11, 12 correspond to the resistor 4 in FIG. 1*a* and the resistors 13, 14, 15 correspond to resistor 2 in the same FIG. Instead of the switch 6 (FIG. 1*a*), in FIG. 2 transistor 8 switches transistor 9, transistor 7 switches transistor 8 and transistor 9 switches transistor 7. The collector resistors 10, 11, 12 are connected to the battery voltage $+U_B$. In order to vary the frequency of the pulse generator a variable negative voltage is led to the base leads of the three transistors via the leakage resistors 16, 17, 18 from the potentiometer 19. To explain the mode of operation of the circuit arrangement in FIG. 2 the voltage curves are used as shown in FIG. 3*a* to 3*c*. *a* is the voltage at point 20, *b* the voltage at point 21 and *c* at point 22 as they occur, at a defined voltage at the potentiometer 19. At the moment, $t_2$ the voltage at point 20 drops to nearly 0 v. (see FIG. 3*a*). After the nonconductive delay time $\tau$ has elapsed, the voltage at point 21 rises to a positive value at the moment $t_3$ (see FIG. 3*b*). Due to this rise the potential at point 22 drops to nearly 0 v. at the moment $t_3$ without any delay time. The transistor has the delay time $\tau$ only when rendered nonconductive but not when said transistor becomes conductive. Due to the voltage drop to nearly 0 v. at point 22 at the moment $t_3$ the voltage again rises to a positive value at point 20 at the moment $t_4$, after the delay time has elapsed. Due to this rise at the moment $t_4$, the voltage at point 21 drops to nearly 0 v. After the delay time, $\tau$ has elapsed at the moment $t_5$, the voltage at point 22 again rises to a positive value and, consequently, the voltage at point 20 simultaneously drops to negative values. As may be gathered from FIG. 3 the time delay pulse generator, operating with three transistors, produces three pulse voltages which are shifted in their respective phase by 120°. A generator with five transistors or more odd-numbered transistors operates in a similar way. The greater the number of transistors the lower the frequency for a given delay time of said transistors.

Figure 4:
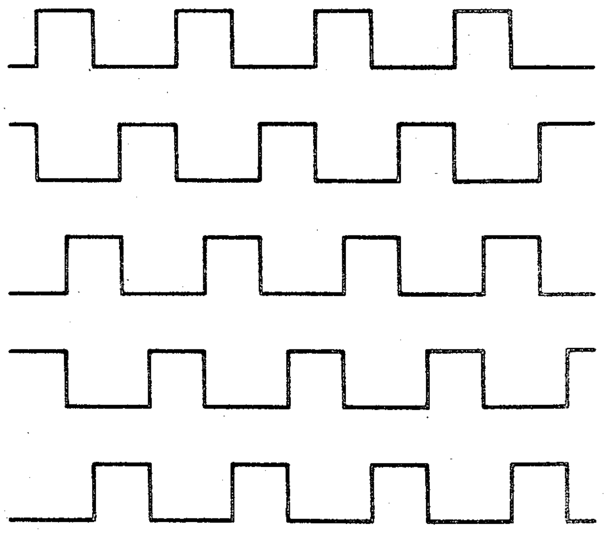
FIG. 4 is a set of waveforms, corresponding to those of FIG. 3, which would apply in the case of a five-stage pulse generator.

FIG. 4 shows a pulse scheme according to FIG. 3, which applies for a pulse generator with five transistors. The voltage diagrams shown can be derived in a manner similar to the voltage diagrams of FIG. 3.

In order to further reduce the frequency with the same number of transistors, the ratio of forward current to "remove current" is advantageously increased in that, instead of the coupling resistors 13, 14, 15, diodes 13*a*, 14*a*, 15*a* (see FIG. 5) are used. The nonconductive delay time of such diodes is less, preferably substantially less, than the delay time of the transistors. With the aid of these diodes it is achieved that the ratio of forward current to "remove current" is substantially increased. For the forward current, the lower value of the forward resistance of the diode is important, whereas for the "remove current" the parallel connection of the very high reverse resistance of the diode with the respective leakage resistor 16, 17, 18, is determinative.

Figure 5:
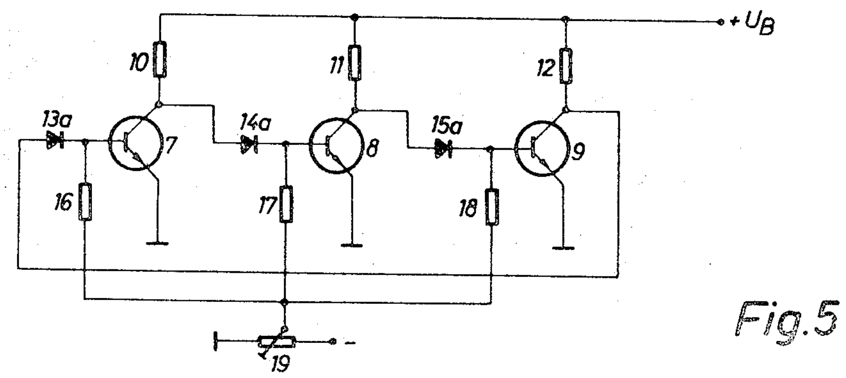
FIGS. 5, 6, and 7 are schematic diagrams of other embodiments of the present invention.
Figure 6:
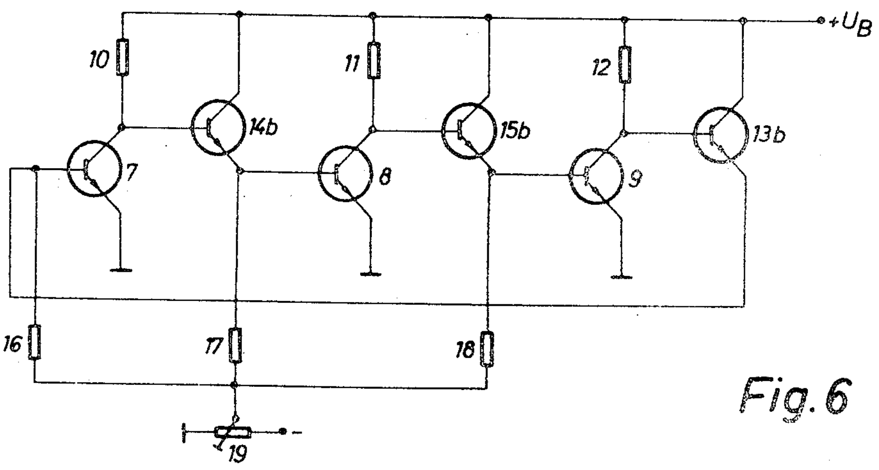

In FIG. 5 the same parts have the same reference symbols as used in FIG. 2. The principle mode of operation is also the same. By applying these coupling diodes it is possible through particular measures in the circuitry to further increase the nonconductive time delay of the transistors and to reduce, consequently, the pulse frequency. The nonconductive delay time is particularly increased if, instead of the coupling resistors 13, 14, 15, transistors 13*b*, 14*b*, 15*b* are used as shown in FIG. 6, which transistors operate in the common collector mode. This circuit arrangement is advantageous for two reasons; (1) the forward current travels to the succeeding base-emitter through an effectively low coupling resistance and 2) the transistors operate as impedance converters so that the collector resistance 10, 11, 12 of the preceding transistors can be selected substantially higher than in the circuit arrangements shown in FIGS. 2 and 3. This ensues that the number of the charge carriers in the base-emitter zone is further increased, whereby the nonconductive delay time is additionally extended. The frequency can also be varied within relatively wide limits by the potentiometer 19 in the circuit arrangements shown in FIGS. 5 and 6. In FIG. 6, too, the same reference symbols were used for the same parts as in FIG. 2. Except for the differences outlined above, the principle mode of operation is the same as in the preceding circuits.

Figure 7:
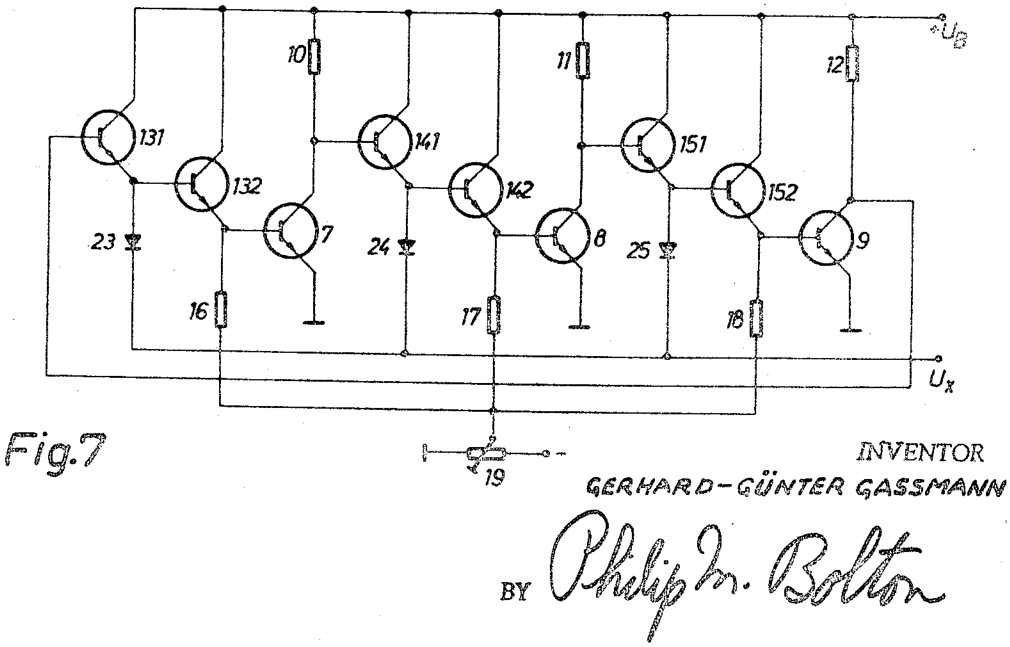

If a circuit arrangement as shown in FIGS. 2, 4, 5 and 6 is manufactured using integrated technique, it is suitable to replace the leakage resistors, 16, 17, 18 by transistors, operating in the common emitter mode, in order to obtain high impedance values in a simple way. In order to obtain extremely high delay times it is suitable to use, the delay time of diodes in addition to the delay time of the transistors. For example, it is possible to subdivide the resistors 13, 14, 15 shown in FIG. 2 into two resistors each and to insert between the connecting points of these two resistors a diode, to the other end of which diode a defined voltage is applied. In order to make full use of the nonconductive delay time of the additional diodes, it is furthermore advantageous to replace the coupling resistors, subdivided into two resistors, by a transistor, operated in the common collector mode. Such an arrangement is shown in FIG. 7. The same parts in this FIG. have the same reference symbols. 131 and 132 are the transistors which correspond to the resistor 13 of FIG. 2, subdivided into two parts. The transistors 141 and 142 correspond to the resistor 14 and the transistors 151, 152 to the resistor 15. The diodes 23, 24 and 25 are inserted between the transistors, operating in the common collector mode and a defined voltage $U_X$. The ostensibly high expenditure of such a circuit arrangement however is economically reasonable in the integrated circuit technique, because in this technique transistorized systems are substantially cheaper than manufactured resistors and capacitors. Very low frequencies are obtained with such a circuit arrangement as shown in FIG. 7 which frequencies have e.g. only a few kc./s, also the transistors have cutoff frequencies of many mc./s, e.g. 200 mc./s, whereby with the aid of such a circuit arrangement, pulse voltages of a very steep edge can be achieved. The collector resistors 10, 11, 12, too, may consist of semiconductor material.

While I have described above the principles of my invention in connection with specific apparatus, it is to clearly understood that this description is made only by way of example and not as a limitation to the scope of my invention as set forth in the objects thereof and in the accompanying claims.

I claim:

1. A self contained oscillating pulse generator comprising:

2N + 1 successive stages, where N is an integer equal to or greater than 1, each stage containing a switching transistor that switches between a saturated conducting condition and a nonconducting condition, said transistor having an emitter, base and collector;

means for DC coupling the collector of each said switching transistor to the base of the next succeeding switching transistor, the first stage switching transistor serving as the next succeeding switching transistor for the last stage switching transistor; and means for biasing each transistor stage to provide that the switching of one said switching transistors to the nonconducting condition causes the next succeeding switching transistor to immediately switch to the saturated conducting condition, and the switching of one of said switching transistors to the saturated conducting condition causes the next succeeding switching transistor to switch to the nonconducting condition after a time interval determined by a storage time delay of the next succeeding switching transistor, whereby the frequency of said generator is determined by said storage time delay of each transistor stage.

2. A pulse generator according to claim 8 further including means for varying said bias means to control the extent of saturation and thereby said storage time delay.

3. A pulse generator according to claim 8 wherein said coupling means are substantially purely resistive.

4. A pulse generator according to claim 8 wherein said coupling means consist solely of semiconductors and resistors.

5. A pulse generator according to claim 4 wherein said semiconductors are diodes.

6. A pulse generator according to claim 4 wherein said semiconductors are transistors.

7. A pulse generator according to claim 4 wherein said semiconductors are a plurality of transistors in tandem and diodes, interconnected to constitute a solid state coupling network.